D. F. ARMSTRONG.
AUTOMOBILE PROTECTOR.
APPLICATION FILED OCT. 22, 1908.
936,075.
Patented Oct. 5, 1909.
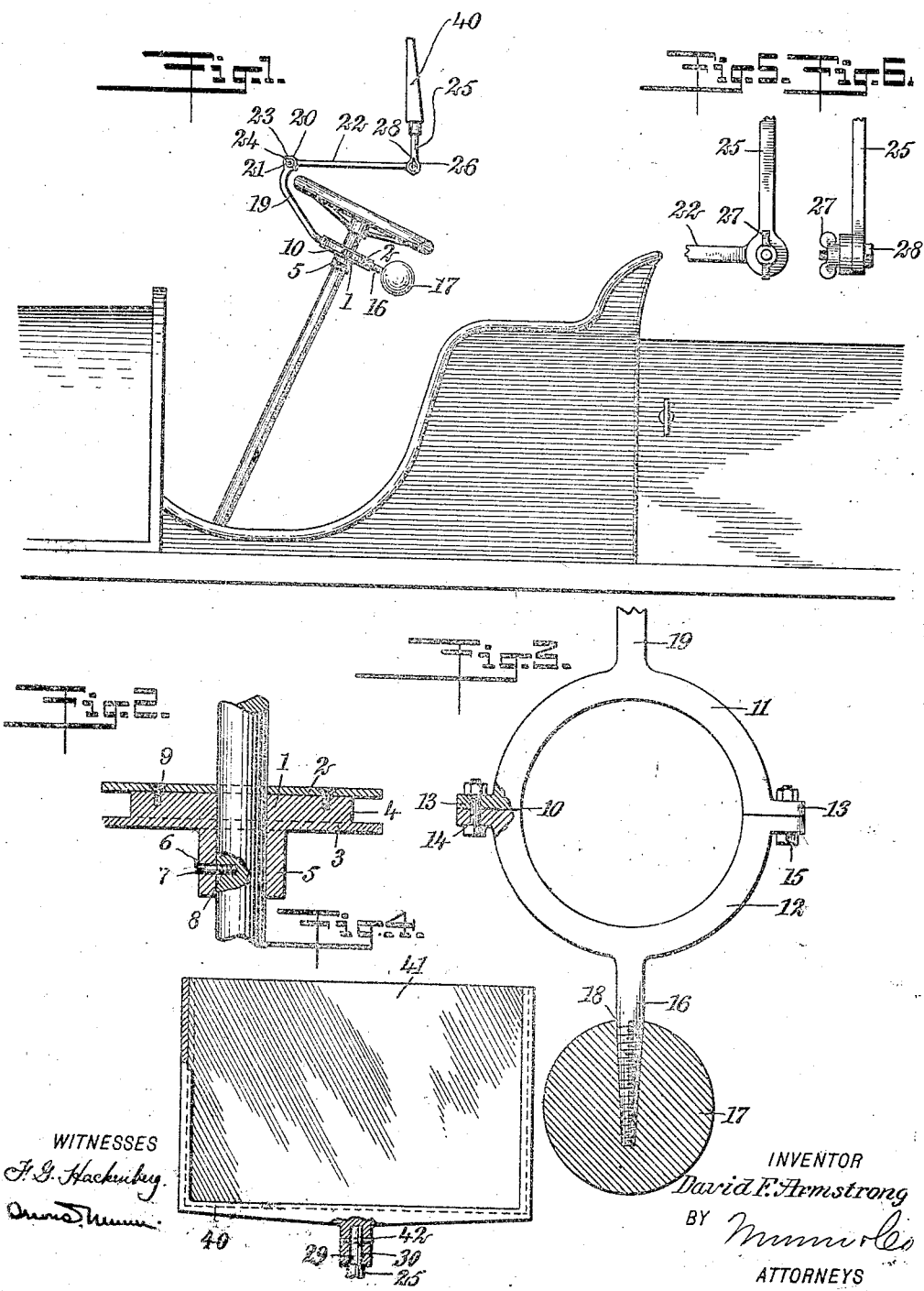
WITNESSES
INVENTOR
David F. Armstrong
BY
ATTORNEYS

UNITED STATES PATENT OFFICE.

DAVID FRANCIS ARMSTRONG, OF GROTON, CONNECTICUT.

AUTOMOBILE-PROTECTOR.

936,075.   Specification of Letters Patent.   Patented Oct. 5, 1909.

Application filed October 22, 1908. Serial No. 458,956.

*To all whom it may concern:*

Be it known that I, DAVID F. ARMSTRONG, a citizen of the United States, and a resident of Groton, in the county of New London and State of Connecticut, have invented a new and Improved Automobile-Protector, of which the following is a full, clear, and exact description.

This invention relates to protectors, and more particularly such as are adapted to be arranged on the steering posts of automobiles to protect the drivers.

An object of the invention is to provide a protector, which can be easily secured to the steering column of an automobile, and which can be fitted with either a transparent or a translucent shield to protect the driver.

A further object is to provide a device of the class described, simple and efficient in construction and inexpensive to manufacture, which can be applied to any steering column so that the steering gear can be operated without displacing the shield.

Reference is to be had to the accompanying drawings forming a part of this specification, in which similar characters of reference indicate corresponding parts in all the views.

Figure 1 is a side elevation showing an embodiment of my invention applied to the steering column of an automobile; Fig. 2 is an enlarged cross section of the collar used to mount the protector on the steering column; Fig. 3 is an enlarged plan view of the split ring and counter-weight used in mounting the device on the collar, and having parts in section; Fig. 4 is an enlarged elevation of the shield, having parts broken away; Fig. 5 is a side elevation of one of the joints which connect the shield to the collar; and Fig. 6 is an enlarged end elevation of the same.

Before proceeding to a more detailed description of my invention, it should be understood that I provide a protector adapted to be used on automobiles or the like, and which is adapted to be arranged on the steering column of the vehicle on which it is employed.

In general, it consists of a collar firmly secured on the column, a split ring movably carried by the collar, and adjustable means connecting the ring and a shield, the latter being adapted to be positioned before the face of the driver to act as protection for the same.

The shield consists of a frame open at the top and a semi-opaque or transparent member adapted to be slidably carried by the frame. This shield, when a semi-opaque member is used, is of particular advantage in driving at night. It should be understood that drivers of automobiles have great difficulty at night in seeing what is on the road when another vehicle equipped with acetylene head-lights is approaching. The glare of the lights from the oncoming car is so great that the driver is unable to see any vehicle which might be between him and the approaching automobile. I provide my device with this semi-opaque member, such as glass or the like, which will protect the eyes of the driver from the oncoming lights, while at the same time, that he is keeping the glass between himself and these lights, he may look past the shield and see if there is any vehicle or obstruction on the road. My device may be further employed in the day time with a transparent member, which will serve to keep the dust and wind from the face of the driver. It should further be understood that several forms of steering columns are used in the automobile industry, and for this purpose I have constructed my device so that should it be used with a solid steering column, the movement of the latter will not displace the shield from before the face of the driver, on account of the counter-weight which is located on the split ring. In the specific form shown in the drawings, I provide a collar 1 adapted to be arranged on the steering column of an automobile, and consisting of a removable plate 2 and a member 3 having a portion suitably shaped so that when the member is in position a channel 4 is formed. The member 3 has a downwardly-disposed portion 5, the latter having an opening 6 adapted to receive a threaded screw pin 7 which serves to engage in a recess 8 in the steering column to hold the collar in place thereon. Screws 9 serve to removably fasten the plate 2 in position on the member 3, it being understood that if desired the plate may be made integral with the member.

Adapted to be slidably arranged about the collar in the channel 4 thereof, is a split ring 10 consisting of two portions 11 and 12 respectively, both having outwardly disposed extensions 13. These extensions are provided with registering openings 14 adapted to receive bolts 15, which serve to lock the two sides of the split ring removably together. The portion 12 of the split ring is provided with a suitably threaded shank 16, adapted to carry a counter-weight 17, the latter having a threaded opening 18 which receives the shank. The portion 11 of the split ring has an upwardly-disposed arm 19 having its upper end 20 enlarged and having an opening 21 extending therethrough.

Removably and adjustably secured to the arm 19 is a link 22, having its ends enlarged and having openings therethrough, one of these openings being adapted to register with the opening 21 of the arm, so that a threaded bolt 23 may be passed therethrough. The threaded end of the bolt receives a correspondingly threaded butterfly nut 24. Located at the other end of the link, from that which is secured to the arm 19, is a standard 25 having its lower end 26 enlarged and provided with an opening, which registers with the opening in the end of the link so that a bolt 28 may be passed therethrough, the bolt being adapted to receive a butterfly nut 27 at its free end. The upper end 29 of the standard 25 is constricted and receives the recessed base 30 of the shield frame 40. The latter is channeled and has its upper side open. Adapted to be received by the frame is a member 41, such as glass or the like. The base 30 of the frame and the constricted end of the standard have registering openings adapted to receive a pin 42, which serves to secure the frame in position.

It should be understood that I do not limit myself to the particular form of shield and shield member shown in the drawings, as others slightly different in shape and character may be employed without departing from the spirit or the scope of the invention; for example, the shield may be curved.

When my device is used with solid steering columns, the split ring which is movably carried on the collar, together with the counterweight, has counter-balancing effect to cause the shield to remain unaffected by the turning of the collar in steering, so that the collar moves within the ring and the shield is not displaced from in front of the driver. When the protector is employed with the ordinary incased steering column, the outer part of which does not turn, the counterweight can be used by the driver as a handle to alter the position of the shield by turning the ring on the collar.

Having thus described my invention, I claim as new and desire to secure by Letters Patent:

1. The combination with a steering column, of a shield, means for rotatably connecting said shield with the steering column, and a counter-balance in connection with said last named means.

2. In combination with a steering column, a shield, adjustable means for removably and rotatably connecting said shield to said steering column, said means being loose on said column, and a counter-balance associated with the shield whereby the latter is held against displacement as said column is operated.

3. The combination with a steering column, of a collar carried by the column, a shield, means rotatable on the collar and connected with the shield for supporting the same, and a counter-balance in connection with said means.

4. In combination with a steering column, a translucent shield, means for rotatably mounting said shield upon said steering column and a counter-balance associated with the shield for normally retaining the shield in a predetermined position.

5. In combination with a steering column, a shield frame adapted to receive interchangeable transparent and semi-opaque members, means for rotatably connecting said shield frame to said steering column and a counter-balance associated with the shield for normally retaining the shield in a predetermined position.

6. In combination with a steering column, a channeled collar removably arranged on said steering column, a split ring rotatably carried by said collar, a counter-weight on said ring for holding the same against displacement, a shield, and adjustable means connecting said shield and said ring, said means serving to position said shield in front of the driver's face.

7. The combination with a steering column, of a ring rotatable thereon, a shield connected with one side of the ring, and a counter-balance with the other.

8. In combination with a steering column, of a shield, means for rotatably mounting said shield upon said steering column and a counterbalance associated with the shield.

In testimony whereof I have signed my name to this specification in the presence of two subscribing witnesses.

DAVID FRANCIS ARMSTRONG.

Witnesses:
JOHN HUGHES,
WILLIAM KARBER.